US010943491B2

(12) United States Patent
Pinchon et al.

(10) Patent No.: US 10,943,491 B2
(45) Date of Patent: Mar. 9, 2021

(54) METHOD OF SYNTHETIC VISUALIZATION OF A SCENE VIEWED FROM AN AIRCRAFT AND TO A SYNTHETIC VISION SYSTEM FOR IMPLEMENTING SUCH A METHOD

(71) Applicant: Airbus Operations (S.A.S.), Toulouse (FR)

(72) Inventors: Thibault Pinchon, Toulouse (FR); Fabrice Bousquet, Balma (FR)

(73) Assignee: Airbus Operations (S.A.S.), Toulouse (FR)

( * ) Notice: Subject to any disclaimer, the term of this patent is extended or adjusted under 35 U.S.C. 154(b) by 215 days.

(21) Appl. No.: 16/158,614

(22) Filed: Oct. 12, 2018

(65) Prior Publication Data

US 2019/0114928 A1 Apr. 18, 2019

(30) Foreign Application Priority Data

Oct. 13, 2017 (FR) ...................................... 1759594

(51) Int. Cl.
*G08G 5/00* (2006.01)
*G01C 23/00* (2006.01)

(52) U.S. Cl.
CPC .......... *G08G 5/0021* (2013.01); *G01C 23/005* (2013.01); *G08G 5/0078* (2013.01); *G08G 5/0086* (2013.01)

(58) Field of Classification Search
CPC .. G08G 5/0021; G08G 5/0078; G08G 5/0086; G01C 23/005; G05D 1/0044
See application file for complete search history.

(56) References Cited

U.S. PATENT DOCUMENTS 9,489,758 B2 11/2016 Ott
2015/0348299 A1* 12/2015 Ott ............................. G06T 7/70
345/632
2018/0366090 A1* 12/2018 Shatzki .................. G02B 27/00

FOREIGN PATENT DOCUMENTS

EP 2950049 A1 12/2015

OTHER PUBLICATIONS

French Search Report for French Application No. 1759594 dated Jun. 5, 2018.

* cited by examiner

*Primary Examiner* — Aaron L Troost
(74) *Attorney, Agent, or Firm* — Jenkins, Wilson, Taylor & Hunt, P.A.

(57) ABSTRACT

A method of synthetic visualization of a scene viewed from an aircraft and synthetic vision system. The system includes a processing unit for generating a synthetic image of a scene ahead of the aircraft, a unit for displaying on a visualization screen a background image corresponding to this synthetic image and symbols for piloting the aircraft, and a monitoring device including a unit for generating at least two virtual control elements, representations of the control elements integrated into the synthetic image, a unit for detecting on the synthetic image the representations and their position, and a unit for verifying whether these positions are consistent with position of a line of zero pitch and/or of a line of zero roll of the aircraft, the display being carried out only in case of consistency between these positions, that is to say the absence of any problem of orientation of the synthetic image.

8 Claims, 3 Drawing Sheets

METHOD OF SYNTHETIC VISUALIZATION OF A SCENE VIEWED FROM AN AIRCRAFT AND TO A SYNTHETIC VISION SYSTEM FOR IMPLEMENTING SUCH A METHOD

CROSS-REFERENCE TO RELATED APPLICATION

This application claims the benefit of and priority to French Patent Application number 17 59594 filed on Oct. 13, 2017, the entire disclosure of which is incorporated by reference herein.

TECHNICAL FIELD

The present disclosure relates to a method of synthetic visualization of a scene viewed from an aircraft and to a synthetic vision system for implementing such a method.

BACKGROUND

A synthetic vision system SVS, which is mounted on an aircraft, is intended to visualize in a synthetic manner a scene, and in particular the relief and obstacles, ahead of the aircraft, which are capable of being viewed from the aircraft, generally from the position of a pilot who is looking directly ahead through the windscreen of the aircraft.

By synthetic scene is understood to mean a scene created and constructed by computer, which comprises the main elements (in particular geographical elements) of the real scene that it seeks to represent, namely the exterior environment outside the aircraft, situated ahead of the aircraft and such as viewed by a pilot.

In a standard manner, such a synthetic vision system comprises:
- a processing unit configured to generate a synthetic image of the scene; and
- a display unit configured to display, on at least one visualization screen of the cockpit, an image comprising, as background image, the synthetic image of the scene generated by the processing unit and on this background image, generally, symbols for piloting the aircraft, indicating the current values of the main flight parameters of the aircraft, such as its speed, its altitude, its heading, etc.

Now, it may happen that the synthetic view (or scene) displayed exhibits a problem of orientation along the pitch axis and/or the roll axis. In this case, the display of this synthetic image is inconsistent with the piloting symbols displayed, in particular, concerning the pitch and the roll of the aircraft.

Such an orientation problem may occur upon an error in the generating of the synthetic image even when using correct aircraft data.

The standard solution for visualization of a synthetic image, with the aid of a synthetic vision system, is therefore not completely satisfactory.

SUMMARY

The object of the present disclosure is to remedy this drawback. To do this, it relates to a method of visualization of a scene capable of being viewed from an aircraft, with the aid of a synthetic vision system mounted on the aircraft, the method comprising:

- a generating step, implemented by a processing unit of the synthetic vision system, consisting in or comprising generating a synthetic image of the scene; and
- a display step implemented by a display unit, the display step comprising a display substep consisting in or comprising displaying, on at least one visualization screen, a background image corresponding to the synthetic image of the scene generated by the generating step and on this background image at least symbols for piloting the aircraft.

According to the disclosure herein, the method comprises a monitoring step, the monitoring step comprising:
- a substep of generating control elements, implemented by a unit for generating control elements, consisting in or comprising generating at least two virtual control elements, located in the scene on either side of a longitudinal axis of the aircraft, in a so-called horizontal plane, the (imaged) representations of the control elements being integrated into the synthetic image generated by the generating step;
- a detection substep, implemented by a detection unit, consisting in or comprising detecting on the synthetic image, the representations of the control elements, and in determining their position;
- a verification substep, implemented by a verification unit, consisting in or comprising verifying whether the positions thus determined of the representations of the control elements are consistent with the position of at least one reference line of the aircraft to within a predetermined margin, the reference line illustrating a line of zero pitch and/or a line of zero roll of the aircraft; and
- an order generating substep, implemented by an order generating unit, consisting in or comprising, in the case of consistency between the positions of the control elements and the position of the reference line, instructing the display on the visualization screen of the synthetic image and of the piloting symbols.

Thus, thanks to the disclosure herein, control elements are generated in the synthetic image, which are positioned in such a way as to allow the implementation of monitoring able to detect an inconsistency between the positions of these control elements and the position of the line of zero pitch and/or of the line of zero roll. This monitoring thus makes it possible to detect, if relevant, an error of orientation (pitch-wise and/or roll-wise) of the synthetic image visualized with respect to the piloting symbols.

Moreover, the display is carried out only in the case of consistency, that is to say in the absence of orientation error, thereby making it possible, when a display is carried out, not to have any orientation problem, and thus to remedy the aforementioned drawback.

Advantageously, the substep of generating control elements consists in or comprises generating two control elements positioned on lines departing from a virtual viewpoint of the scene, situated on the longitudinal axis, the lines diverging from the longitudinal axis, on either side of this longitudinal axis, by an angle substantially equal to half the field of view (viewed from the virtual viewpoint by the synthetic vision system).

Furthermore, advantageously, the substep of generating control elements consists in or comprises generating two control elements, each located at a distance from the virtual viewpoint which is less than a predetermined limit distance.

Additionally, advantageously, the substep of generating control elements consists in or comprises generating two control elements, each exhibiting a size equal to a pixel of a display on the visualization screen.

Furthermore, advantageously, the substep of generating control elements consists in or comprises generating two control elements exhibiting a distinctive color in the synthetic image.

The present disclosure also relates to a synthetic vision system for an aircraft, intended to visualize a scene capable of being viewed from the aircraft, the synthetic vision system comprising:
- a processing unit configured to generate a synthetic image of the scene; and
- a display unit configured to display, on at least one visualization screen, a background image corresponding to the synthetic image of the scene generated by the processing unit and on this background image at least symbols for piloting the aircraft.

According to the disclosure herein, the synthetic vision system comprises, moreover, a monitoring device comprising:
- a unit for generating control elements which is configured to generate at least two virtual control elements, located in the scene on either side of a longitudinal axis of the aircraft, in a so-called horizontal plane, the representations (imaged) of the control elements being integrated into the synthetic image generated by the processing unit;
- a detection unit configured to detect on the synthetic image the representations of the control elements, and to determine their position;
- a verification unit configured to verify whether the positions thus determined of the representations of the control elements are consistent with the position of at least one reference line of the aircraft to within a predetermined margin, the reference line illustrating a line of zero pitch and/or a line of zero roll of the aircraft; and
- an order generating unit configured to, in the case of consistency between the positions of the control elements and the position of the reference line, instruct the display unit so that it displays on the visualization screen the synthetic image and the piloting symbols.

The present disclosure also relates to an aircraft, in particular a transport aircraft, which is provided with at least one synthetic vision system, such as that described above.

BRIEF DESCRIPTION OF THE DRAWINGS

The appended, example figures will elucidate the manner in which the disclosure herein may be embodied. In these figures, identical references designate similar elements. More particularly.

DETAILED DESCRIPTION

Figure 1:
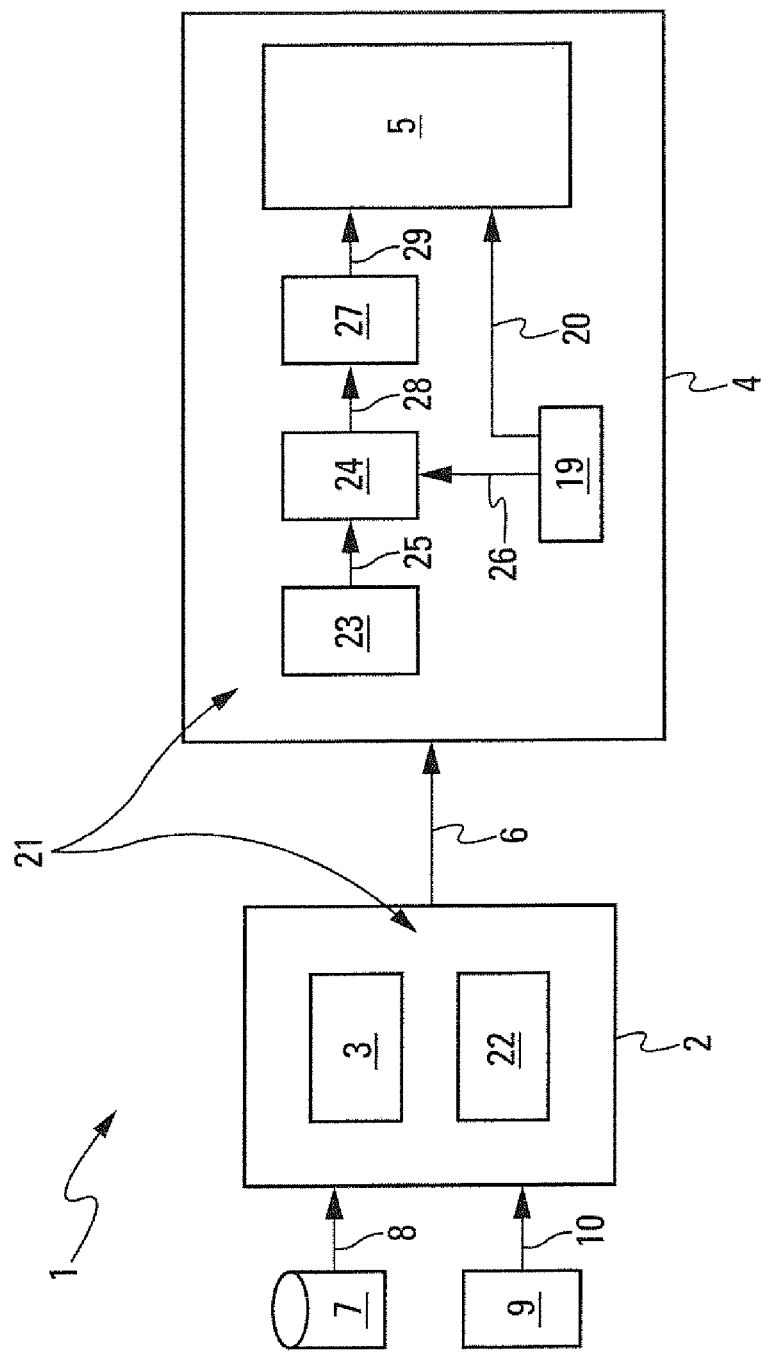
FIG. 1 is a schematic diagram of a particular embodiment of a synthetic vision system.

The system 1 represented schematically in FIG. 1 and making it possible to illustrate the disclosure herein is a synthetic vision system, of SVS type, for an aircraft, in particular a transport aircraft. It makes it possible in particular to visualize, in a synthetic manner, a scene capable of being viewed from the aircraft.

Figure 2:
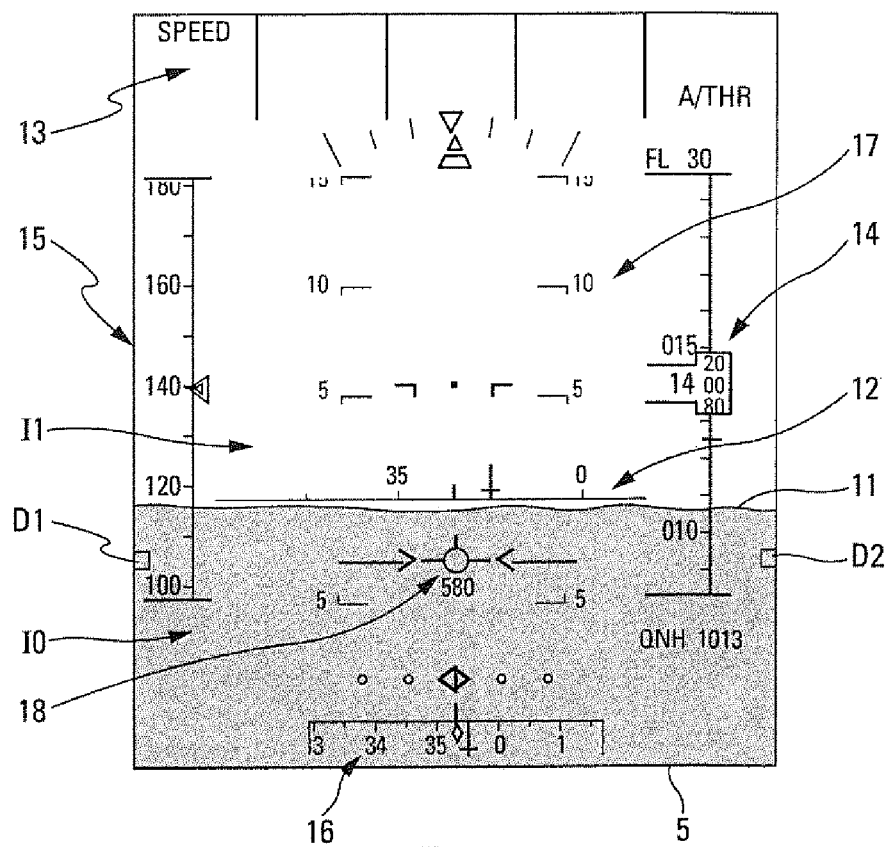
FIG. 2 schematically shows an example of visible display on a visualization screen of a synthetic vision system.

This system 1 which is installed on the aircraft AC (FIG. 5) comprises, as represented in FIG. 1:
- a processing unit 2 comprising a processing element 3 configured to generate a synthetic image of the scene; and
- a display unit 4 configured to display, on at least one visualization screen 5, an image I1 (FIG. 2), comprising:
- a background image corresponding to the synthetic image I0 of the scene (generated by the processing unit 2 and received via a link 6); and
- superposed on this background image, at least symbols for piloting the aircraft, indicating the current values of main flight parameters of the aircraft, such as its speed, its altitude, its heading, etc., as specified hereinbelow with reference to FIG. 2.

To generate the synthetic image I0, the processing element 3 uses, in a standard manner:
- data of the terrain overflown and if relevant of an airport, which are received from at least one standard database 7, via a link 8; and
- current values of flight parameters of the aircraft, such as its attitude and its position for example, which are received from a set 9 of standard sensors of the aircraft, via a link 10.

The display unit 4 displays, in real time, the synthetic image I0 on the visualization screen 5, as background image, in a three-dimensional representation (with perspective view) and superimposed on this background image a plurality of piloting symbols. The superposition is carried out in such a way that the image I0 and the piloting symbols are visualized simultaneously in the form of the image I1, as is represented by way of example in FIG. 2.

So as not to overload FIG. 2, the relief has been represented in two parts, the greyed one corresponding to the ground which is situated below a horizon line 11 and the other of which (in white) corresponds to the sky which is situated above the horizon line 11.

The synthetic image I0 comprises:
- a synthetic relief representing a three-dimensional artificial view of the relief ahead of the aircraft; and
- possible obstacles, such as for example buildings, which enter into the field of view of the synthetic relief represented.

The synthetic image I0 represents a zone corresponding to what is seen by the pilot looking directly ahead of the aircraft through the windscreen. The features of the relief outside of this field of view are not displayed on the visualization screen 5.

The display of the synthetic image I0 is in particular intended to inform the pilot as to the relief and obstacles ahead of the aircraft.

To generate the synthetic image I0, the processing element 3 implements, in a standard manner, a generating step to generate a three-dimensional representation (in 3D) of a synthetic environment on a two-dimensional (2D) visualization screen. This generating step comprises:
- a processing substep consisting in or comprising calculating the coordinates of geographical elements (points, vectors, triangles) describing the scene in 3D, on the basis of the data received from the database 7 and from the set 9; and a pixilation substep consisting in or comprising converting an image into a vector image format and then in converting it into a pixelated image (comprising pixels for visualization on a screen).

Additionally, the data making it possible to display the piloting symbols (in the image I1) on the visualization screen 5 are received from a generator 19 of primary flight parameters, via a link 20. This generator 19 can be integrated into the display unit 4, as represented in FIG. 1, or form part of another system of the aircraft.

In the example of FIG. 2, the display unit 4 displays on the image I1, as piloting symbols, in particular:
- a horizon line 12, generally a white line, indicating the real horizon;
- a set 13 of indications relating to modes of guidance or of piloting of the aircraft;
- an altitude scale 14;
- a speed scale 15;
- a heading scale 16;
- a slope scale 17; and
- a symbol 18 illustrating the current pitch of the aircraft.

Figure 3:
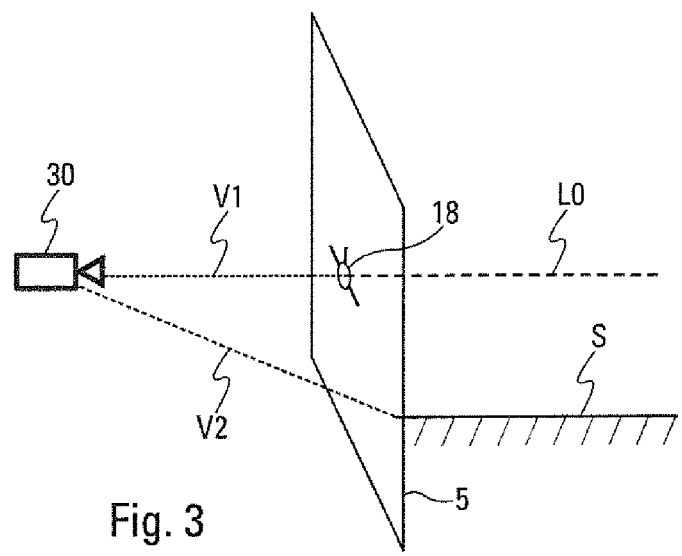
FIGS. 3 and 4 schematically illustrate a synthetic image, respectively, without orientation error and with an orientation error.

In case of correct orientation of the synthetic view (as illustrated in FIG. 3 by a synthetic camera 30, according to which the synthetic image I0 has been created), the synthetic camera 30 is aligned (V1) with a zero pitch line L0, and the representation (V2) with respect to the ground S is correct.

Figure 4:
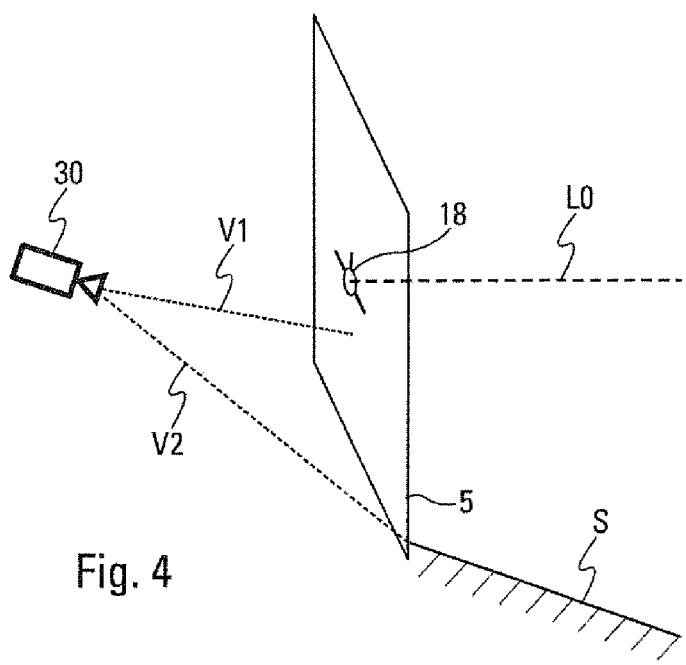

However, an erroneous orientation of the synthetic view may occur, as illustrated by a poor orientation of the synthetic camera 30 in FIG. 4, so that the background image I0 is then inconsistent with the piloting symbols displayed.

More particularly, it may happen that the synthetic view (or scene) displayed exhibits an orientation problem along the pitch axis and/or the roll axis.

According to the disclosure herein, the system 1 comprises a monitoring device 21 making it possible in particular to detect such an orientation problem.

Figure 5:
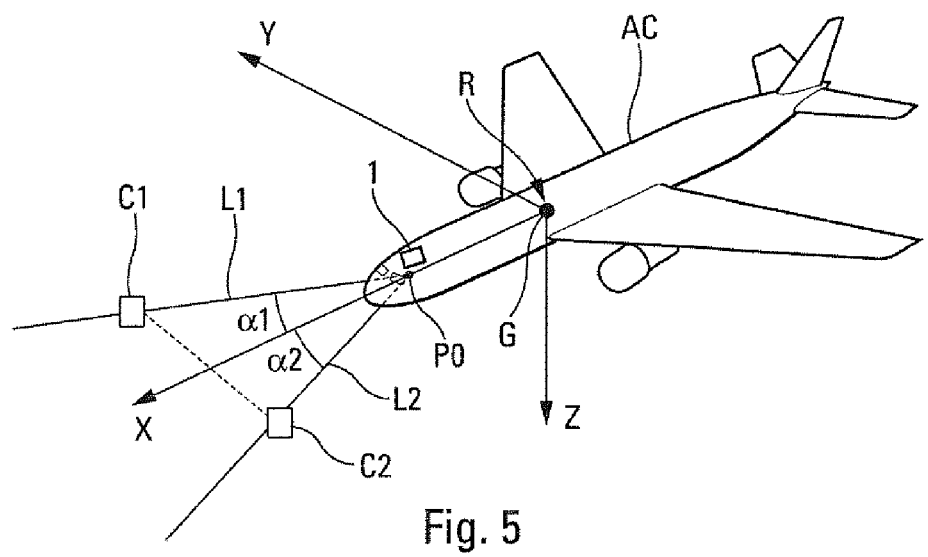
FIG. 5 is a perspective view of an aircraft provided with a synthetic vision system.

To do this the monitoring device 21 comprises, as represented in FIG. 1, a unit 22 for generating control elements which is integrated, preferably, into the processing unit 2. This unit 22 is configured to generate at least two virtual control elements C1 and C2. These control elements C1 and C2 are located in the scene to be displayed, on either side of a longitudinal axis X of the aircraft AC, in a so-called horizontal plane XY, as represented in FIG. 5. These control elements C1 and C2 are integrated into the synthetic image I0 generated by the processing element 3 of the processing unit 2, in the form of image parts, termed representations (imaged) D1 and D2 of the control elements C1 and C2, as is represented in FIG. 2.

In FIG. 5 are represented the aircraft AC and a reference frame R departing from its centre of gravity G and comprising:
- the longitudinal axis X of the aircraft AC;
- a vertical axis Z, the longitudinal axis X and the vertical axis Z forming a plane XZ corresponding to the vertical plane of symmetry of the aircraft AC; and
- an axis Y orthogonal to the axes X and Z forming with the axis X a horizontal plane XY.

The monitoring device 21 comprises, moreover, as represented in FIG. 1, the following units integrated into the display unit 4:
- a detection unit 23 configured to detect, on the synthetic image I0 generated by the processing element 3, the representations D1 and D2 of the control elements C1 and C2, and to determine the positions of these representations D1 and D2;
- a verification unit 24 connected by way of a link 25 to the detection unit 23 and configured to verify whether the positions thus determined of the representations D1 and D2 of the control elements C1 and C2 are consistent (or inconsistent) with the position of a reference line of the aircraft (and received from the generator 19 by way of a link 26) to within a predetermined margin. To do this, the verification unit 24 verifies whether the straight line passing through the positions of the representations D1 and D2 is coincident with the reference line, to within the (angular) margin. The reference line is a line of zero pitch representing a line L0 (FIG. 4) corresponding to an absence of pitch of the aircraft and/or a line of zero roll representing a line corresponding to an absence of roll of the aircraft. It may be illustrated by the symbol 18; and
- an order generating unit 27 configured, in the case of consistency (confirmed by the verification unit 24 via a link 28) between the positions of the representations D1 and D2 of the control elements C1 and C2 and the position of the reference line, to instruct (via a link 29) the display unit 4 (or the visualization screen 5) so that the synthetic image and the piloting symbols are displayed on the visualization screen 5.

The orientation of the synthetic scene is validated, the reference line being a critical parameter whose integrity is verified.

Moreover, in case of inconsistency (confirmed by the verification unit 24 via a link 28), the display is not carried out on the visualization screen 5.

In a preferred embodiment, the unit 22 for generating control elements is configured to generate two control elements C1 and C2 positioned on lines L1 and L2 departing from a virtual viewpoint P0 of the scene, which is situated on the longitudinal axis X of the aircraft AC, as represented in FIG. 5. The lines L1 and L2 diverge from the longitudinal axis X, on either side of this longitudinal axis X, by an angle α1, α2 substantially equal to half the field of view FOV viewed from the virtual viewpoint P0 by the synthetic vision system 1. Therefore, in this preferred embodiment, the angles α1 and α2 are equal.

Thus, the representations D1 and D2 (of the control elements C1 and C2) are displayed at the extremities of the visualization screen 5.

Furthermore, the unit 22 is configured to generate two control elements C1 and C2 located respectively at distances from the virtual viewpoint P0 that are preferably less than a predetermined limit distance, for example 50 metres.

Additionally, preferably, the unit 22 is configured to generate two control elements C1 and C2 which are such that each of their representations D1 and D2 displayed on the visualization screen 5 exhibits a size equal to a pixel of the display carried out on this visualization screen 5, so as to limit the visual impact for the crew of the aircraft on the image I1 displayed.

Furthermore, in a particular embodiment, the unit 22 is configured to generate two control elements C1 and C2 whose representations D1 and D2 exhibit a distinctive color in the synthetic image I0 (also represented in color). This distinct color is such that it is used only to represent these representations D1 and D2 so that the detection unit 23 is able to detect them easily and rapidly.

Within the framework of the present disclosure, the unit 22 for generating control elements can also generate more than two control elements.

Described hereinbelow is a method of visualization of a scene capable of being viewed from the aircraft, which is implemented by the synthetic vision system 1 described above.

Figure 6:
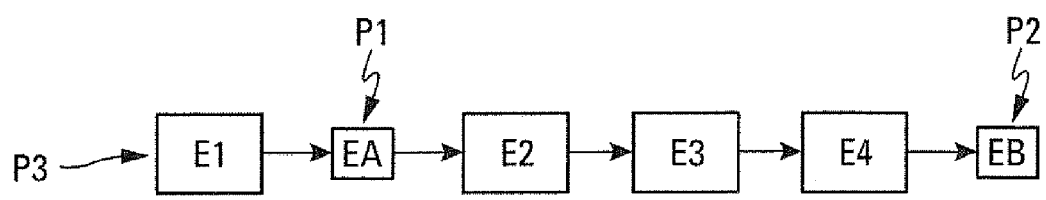
FIG. 6 schematically shows a method of synthetic visualization provided with a step of monitoring the orientation of a synthetic image.

This method comprises, as represented in FIG. 6 (in conjunction with FIG. 1):
- a generating step P1, implemented by a processing unit 2 of the synthetic vision system 1, comprising a generating substep EA consisting in or comprising generating a synthetic image of the scene; and
- a display step P2 implemented by the display unit 4, the display step P2 comprising a display substep EB consisting in or comprising displaying, on the visualization screen 5, a background image corresponding to the synthetic image of the scene generated by the generating step P1 and on this background image at least symbols for piloting the aircraft.

The method comprises, moreover, a monitoring step P3. This monitoring step P3, implemented by the monitoring device 21, comprises:
- a substep of generating control elements E1, implemented by the unit 22 for generating control elements, consisting in or comprising generating at least two virtual control elements, the representations of the control elements being integrated into the synthetic image generated by the generating step P1 in the generating substep EA;
- a detection substep E2, implemented by the detection unit 23, consisting in or comprising detecting on the synthetic image, the representations of the control elements, and in determining their position;
- a verification substep E3, implemented by the verification unit 24, consisting in or comprising verifying whether the positions thus determined of the representations of the control elements are consistent with the position of a line of zero pitch and/or a line of zero roll of the aircraft to within a margin; and
- an order generating substep E4, implemented by an order generating unit 27, consisting in or comprising, in the case of consistency between the positions of the control elements and the position of the line of zero pitch and/or the line of zero roll, instructing the display on the visualization screen 5 of the synthetic image and of the piloting symbols (in the display substep EB).

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of synthetic visualization of a scene viewed from an aircraft, with aid of a synthetic vision system mounted on the aircraft, the method comprising:
   generating, by a processing unit of the synthetic vision system, a synthetic image of the scene;
   displaying, on at least one visualization screen of a display unit, a background image corresponding to the synthetic image of the scene and on the background image at least symbols for piloting the aircraft; and
   a monitoring step comprising:
      generating, by the display unit, at least two virtual control elements, located in the scene on either side of a longitudinal axis of the aircraft, in a horizontal plane, representations of the virtual control elements being integrated into the synthetic image;
      detecting, by the display unit, on the synthetic image the representations of the virtual control elements, and in determining their position;
      verifying, by the display unit, whether the positions determined of the representations of the virtual control elements are consistent with a position of at least one reference line of the aircraft to within a predetermined margin, the reference line illustrating a line of zero pitch and/or a line of zero roll of the aircraft; and
      when positions of the representations of the virtual control elements are consistent with the position of the reference line, instructing the display on the visualization screen of the synthetic image and of the piloting symbols;
   wherein generating virtual control elements comprises generating representations of two virtual control elements each exhibiting a size equal to a pixel on the visualization screen.

2. The method according to claim 1, wherein generating virtual control elements comprises generating the two virtual control elements, each located at a distance from the virtual viewpoint which is less than a predetermined limit distance.

3. The method according to claim 1, wherein generating virtual control elements comprises generating two virtual control elements exhibiting a distinctive color in the synthetic image.

4. The method of claim 1, wherein generating virtual control elements comprises generating the at least two virtual control elements positioned on lines departing from a virtual viewpoint of the scene, situated on the longitudinal axis, the lines diverging from the longitudinal axis on either side of the longitudinal axis, by an angle substantially equal to half a field of view viewed from the virtual viewpoint by the synthetic vision system.

5. A synthetic vision system for an aircraft, to visualize a scene viewed from the aircraft, the synthetic vision system comprising:
   a processing unit configured to generate a synthetic image of the scene;
   a display unit configured to display, on at least one visualization screen, a background image corresponding to the synthetic image of the scene generated by the processing unit and on this background image at least symbols for piloting the aircraft; and
   a monitoring device comprising the processing unit and the display unit comprising, the monitoring device being configured to:
      generate at least two virtual control elements, located in the scene on either side of a longitudinal axis of the aircraft, in a horizontal plane, representations of the virtual control elements being integrated into the synthetic image generated by the processing unit;
      detect on the synthetic image the representations of the virtual control elements, and to determine their position;

verify whether positions determined of the representations of the virtual control elements are consistent with a position of at least one reference line of the aircraft to within a predetermined margin, the reference line illustrating a line of zero pitch or a line of zero roll of the aircraft, or illustrating a line of zero pitch and a line of zero roll of the aircraft; and when positions of the representations of the virtual control elements are consistent with the position of the reference line, instruct the display unit to display on the visualization screen the synthetic image and the piloting symbols;

wherein each of the representations of two virtual control elements exhibit a size equal to a pixel on the visualization screen.

6. The synthetic vision system of claim 5, wherein the at least two virtual control elements are configured to be positioned on lines departing from a virtual viewpoint of the scene, situated on the longitudinal axis, the lines diverging from the longitudinal axis on either side of the longitudinal axis, by an angle substantially equal to half a field of view viewed from the virtual viewpoint by the synthetic vision system.

7. An aircraft comprising at least one synthetic vision system, the synthetic vision system comprising:

a processing unit configured to generate a synthetic image of the scene;

a display unit configured to display, on at least one visualization screen, a background image corresponding to the synthetic image of the scene generated by the processing unit and on this background image at least symbols for piloting the aircraft; and a monitoring device comprising the processing unit and the display unit, the monitoring device being configured to:

generate at least two virtual control elements, located in the scene on either side of a longitudinal axis of the aircraft, in a horizontal plane, representations of the virtual control elements being integrated into the synthetic image generated by the processing unit;

detect on the synthetic image the representations of the virtual control elements, and to determine their position;

verify whether positions determined of the representations of the virtual control elements are consistent with a position of at least one reference line of the aircraft to within a predetermined margin, the reference line illustrating a line of zero pitch or a line of zero roll of the aircraft, or illustrating a line of zero pitch and a line of zero roll of the aircraft; and when-positions of the representations of the virtual control elements are consistent with the position of the reference line, instruct the display unit to display on the visualization screen the synthetic image and the piloting symbols;

wherein each of the representations of two virtual control elements exhibit a size equal to a pixel on the visualization screen.

8. The aircraft of claim 7, wherein the at least two virtual control elements are configured to be positioned on lines departing from a virtual viewpoint of the scene, situated on the longitudinal axis, the lines diverging from the longitudinal axis on either side of the longitudinal axis, by an angle substantially equal to half a field of view viewed from the virtual viewpoint by the synthetic vision system.

* * * * *